United States Patent
Falconer et al.

(10) Patent No.: US 10,814,846 B2
(45) Date of Patent: Oct. 27, 2020

(54) TRACTION CONTROL BASED ON FRICTION COEFFICIENT ESTIMATION

(71) Applicant: Ford Global Technologies, LLC, Dearborn, MI (US)

(72) Inventors: William Falconer, Detroit, MI (US); Leonard Eber Carrier, Dearborn, MI (US); Zachary Konchan, Westland, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/675,283

(22) Filed: Aug. 11, 2017

(65) Prior Publication Data
US 2019/0047527 A1    Feb. 14, 2019

(51) Int. Cl.
*B60T 8/17* (2006.01)
*B60T 8/175* (2006.01)
*B60T 8/32* (2006.01)
*B60W 10/184* (2012.01)
*B60W 30/18* (2012.01)

(52) U.S. Cl.
CPC ............ *B60T 8/175* (2013.01); *B60T 8/3205* (2013.01); *B60W 10/184* (2013.01); *B60W 30/18172* (2013.01); *B60T 2210/12* (2013.01); *B60T 2260/06* (2013.01); *B60T 2270/208* (2013.01); *B60W 2420/42* (2013.01); *B60W 2520/26* (2013.01); *B60W 2552/40* (2020.02)

(58) Field of Classification Search
CPC .. B60T 8/175; B60T 8/3205; B60T 2270/208; B60T 2260/06; B60T 2210/12; B60W 30/18172; B60W 10/184; B60W 2550/148; B60W 2520/26; B60W 2420/42; B60W 10/18; B60W 40/068; B60W 30/18; B60W 2520/266; B60W 2552/40; B60W 2510/18; B60W 2720/26; B60W 30/02; B60W 10/06
See application file for complete search history.

(56) References Cited

U.S. PATENT DOCUMENTS

| | | | |
|---|---|---|---|
| 4,712,635 A | 12/1987 | Sumiya et al. | |
| 6,266,602 B1 * | 7/2001 | Yamaura | B60T 8/172 303/112 |
| 6,397,140 B2 | 5/2002 | Minowa et al. | |
| 9,598,087 B2 | 3/2017 | Zhao et al. | |
| 9,643,617 B2 | 5/2017 | Fischer et al. | |

(Continued)

FOREIGN PATENT DOCUMENTS

DE    102013211027 A1    12/2014

*Primary Examiner* — Michael V Kerrigan
(74) *Attorney, Agent, or Firm* — Frank Lollo; Eversheds Sutherland (US) LLP

(57) ABSTRACT

Method and apparatus are disclosed for traction control based on friction coefficient estimation. An example vehicle includes a plurality of sensors to measure qualities of a surface of a road and an anti-lock brake system module. The anti-lock brake system module (a) estimates confidence values for different road surface types based on the qualities of the surface of the road, (b) estimates a coefficient of friction between the road and tires of the vehicle based on the confidence values, and (c) adapt a traction control system by altering a target slip based on the coefficient of friction.

14 Claims, 4 Drawing Sheets

(56) References Cited

U.S. PATENT DOCUMENTS

| | | |
|---|---|---|
| 9,836,660 B2 | 12/2017 | Zhao et al. |
| 9,928,427 B2 | 3/2018 | Zhao et al. |
| 9,971,945 B2 | 5/2018 | Zhao et al. |
| 2005/0143889 A1 | 6/2005 | Isaji et al. |
| 2011/0264300 A1* | 10/2011 | Tuononen ............... B60T 8/172 701/1 |
| 2016/0176408 A1 | 6/2016 | Lynch |
| 2016/0214486 A1* | 7/2016 | Suzuki .................... B60T 8/175 |
| 2018/0060674 A1* | 3/2018 | Zhao ..................... B60W 40/06 |
| 2018/0105206 A1* | 4/2018 | Gullven .................. B62D 6/02 |

* cited by examiner

TRACTION CONTROL BASED ON FRICTION COEFFICIENT ESTIMATION

TECHNICAL FIELD

The present disclosure generally relates to traction control systems in a vehicle and, more specifically, traction control based on friction coefficient estimation.

BACKGROUND

A stability and traction control system detects a loss of traction on driving wheel. This is often caused by engine torque and throttle input being mismatched to road condition. The stability and traction control system applies brakes to that wheel so it is not spinning faster than the other wheels. However, when the stability and traction control system does not take into account the environment that it is driving through, the system reacts to slipping instead of proactively managing and anticipating a loss of traction.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Method and apparatus are disclosed for traction control based on friction coefficient estimation. An example vehicle includes a plurality of sensors to measure qualities of a surface of a road and an anti-lock brake system module. The anti-lock brake system module (a) estimates confidence values for different road surface types based on the qualities of the surface of the road, (b) estimates a coefficient of friction between the road and tires of the vehicle based on the confidence values, and (c) adapt a traction control system by altering a target slip based on the coefficient of friction.

A method includes measuring qualities of a surface of a road ahead of a vehicle with a first sensor and a second sensor different than the first sensor. The method also includes (a) generating first confidence values for different road surface types based on the qualities of the surface of the road measured by the first sensor, and (b) generating second confidence values for the different road surface types based on the qualities of the surface of the road measured by the second sensor. Additionally, the method includes estimating a coefficient of friction between the road and tires of the vehicle based on an aggregate of the first and second confidence values. The method includes controlling, with an anti-lock brake system, torque applied to wheels of the vehicle based on the coefficient of friction.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
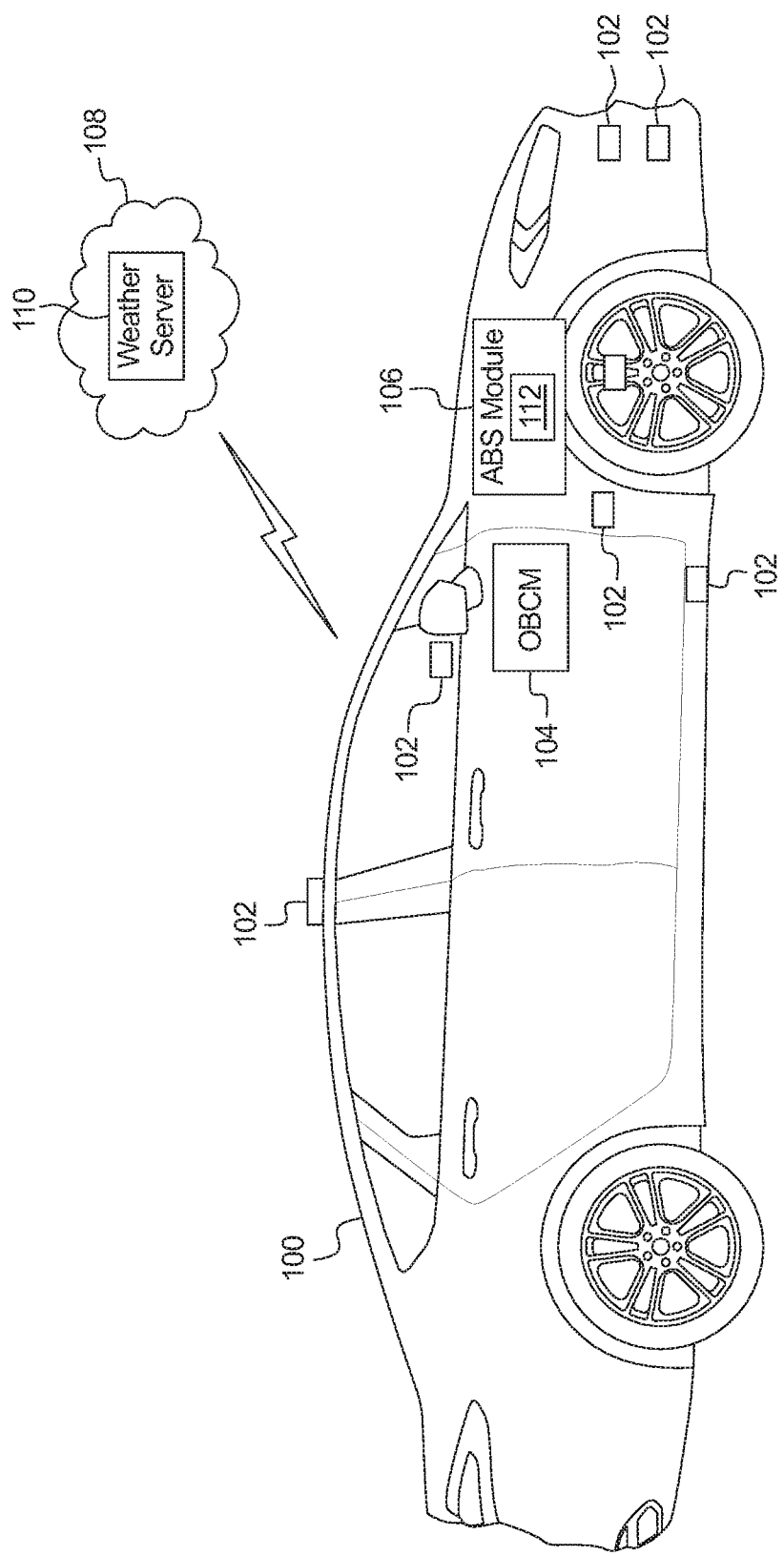
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As used herein, a traction control-based system refers to any vehicle system that controls the force applied by the wheels of the vehicle to a surface of a road. Example traction control-based systems include traction control systems, electronic stability systems, roll stability systems, etc. The coefficient of friction between the tires of a vehicle and the surface of the road is determined by the characteristics of the tire (e.g., the grip of the tire, the surface area of the tire/road interface, etc.) and the characteristics of the surface of the road. For example, the coefficient of friction between the tires and an icy or wet road is lower than the coefficient of friction on dry asphalt. As disclosed below, with an estimated coefficient of friction, the traction control-based system adapts a slip target to control the force of the wheels on the road in response to a change of friction environment. For example, the traction control system may control the torque of the wheels differently when the road surface is ice than when the road surface is covered in gravel. Slip is a ratio of vehicle velocity to wheel spin velocity. For example, when the vehicle velocity and wheel spin velocity are equal, the slip is 0% and when the vehicle velocity is zero and the wheel spin velocity is greater than zero, the slip is 100%. A slip of 100% means that the vehicle is not moving despite the wheel spinning. Different surfaces have different idea slip amounts for the vehicle to move safely on the surface (e.g., based on the coefficient of friction). For example, a vehicle may get stuck in sand if there in not at least some slip. Traditionally, for example, tractions control systems work to eliminate all slip not knowing what the coefficient of friction. This, in such a scenario, the vehicle would not move in sand. The traction control-based system of this disclosure sets a target slip based on the coefficient of friction. The traction control-based system uses one or more methods to estimate the coefficient between the tires of a vehicle and the ground that the vehicle is currently traversing or is projected to traverse based on the vehicle's current trajectory. When multiple methods are used, the results of each method are multiplied by confidence factors to produce confidence estimates of the possible road conditions. The higher confidence estimates are given more weight when estimating the coefficient of friction in the path of the vehicle.

One method involves analyzing a signal from a sensor (e.g., measuring suspension oscillation, road noise, tire pressure, etc.) to determine whether the signal is characteristic of the vehicle driving over a particular road surface. With this method, the traction control system applies several filters designed to filter out signals from a particular road condition (e.g., asphalt, snow, mud, gravel, etc.). The amount that a particular filter makes a signal smooth (e.g., attenuates) increases the confidence that the vehicle is driving on the corresponding road type. For example, when a filter tuned to a gravel surface causes the signal to become substantially smooth, then the traction control system may be confident that the vehicle is traveling on gravel.

Another method involves analyzing visual data from cameras (e.g., a standard camera, an RGB camera, an infrared camera, etc.) and compares the reflectivity, color, and smoothness of the images against control images for different surfaces. The confidence that the vehicle is traveling on a particular surface is related to the amount that the images matches a control image of that surface. For example, an image of a white reflective surface may match a control image of a snowy surface. This method facilitates determining a quality of the surface by different sizes of features. For example, the method may distinguish small grains from large grains to differentiate between sandy or gravel surfaces from tile or rocky surfaces. Additionally, with this method, the vehicle may construct luminosity maps to determine the nature of the surface. Different luminosity values ($\mu$) are indicative of different surfaces. For example, dry asphalt may have one characteristic luminosity value while wet asphalt may have another luminosity value. A measured luminosity is compared to a table that indicates confidences of the different types of road surfaces give the input luminosity.

In another method, the vehicle uses range detection sensors (e.g., LiDAR, RADAR, ultrasonic, etc.) to broadcast wave signals at regular intervals. The wave signals reflect and refract off of the surface. The vehicle analyzes the pattern of the reflections and/or refractions to determine the type of surface. For example, using this method, the vehicle may determine whether the surface of the road is smooth (e.g., indicative of asphalt, ice, etc.) or rough (e.g., indicative of gravel or snow).

In another method, the vehicle analyzes changes in steering current draw at a constant speed. When the steering current draw increases, the vehicle may determine that the surface corresponding with a surface with a higher amount of traction and vice versa.

Additionally, in some examples, the vehicle also analyzes environmental data (e.g., weather data, ambient temperature data, humidity data, precipitation data, etc.) to alter the confidence levels of certain road types. For example, the environmental data indicative that is it cold outside may increase the confidence levels that the road surface is snow or ice.

As described below, the vehicle uses one or more of these methods to estimate the surface type of the road on which the vehicle is driving. In some examples, the uses multiple methods to generate confidence levels for multiple surface types and selects one of the surface types for the road based on which surface type has the highest confidence level. For example, the wave signal may indicate that the surface of the road is reflective, the signal from one of the sensors indicate the vehicle is traveling on asphalt, and the environmental data indicates that it has rained within the last 24 hours, the confidence levels may indicate that the vehicle is traveling on wet asphalt.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes sensors 102, an on-board communications module (OBCM) 104, and a anti-lock brake system (ABS) module 106.

The sensors measure properties of and around the vehicle 100. The sensors 102 may be arranged in and around the vehicle 100 in any suitable fashion. The sensors 102 may mounted to measure properties around the exterior of the vehicle 100. For examples, such sensors 102 may include cameras (e.g., a standard camera, an RGB camera, an infrared camera) and range detection sensors (e.g., RADAR, LiDAT, ultrasonic, etc.), etc. Additionally, some sensors 102 may be mounted inside the cabin of the vehicle 100 or in the body of the vehicle 100 (such as, the engine compartment, the wheel wells, etc.) to measure properties in the interior of the vehicle 100. For example, such sensors 102 may include accelerometers, odometers, tachometers, pitch and yaw sensors, wheel speed sensors, microphones, tire pressure sensors, biometric sensors, suspension vibration sensors, etc. These sensors 102 produce signals that may be analyzed to determine the type of surface that the vehicle 100 is currently traveling on.

The on-board communications module 104 includes wired or wireless network interfaces to enable communication with external networks 108. The on-board communications module 104 also includes hardware (e.g., processors, memory, storage, antenna, etc.) and software to control the wired or wireless network interfaces. In the illustrated example, the on-board communications module 104 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), dedicated short range communication (DSRC), and Wireless Gigabit (IEEE 802.11ad), etc.). In some examples, the on-board communications module 104 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, a police mobile computer, etc.). In such examples, the on-board communications module 104 may communicated with the external network 108 via the coupled mobile device.

The external network(s) 108 may be a public network, such as the Internet; a private network, such as an intranet; or combinations thereof, and may utilize a variety of networking protocols now available or later developed including, but not limited to, TCP/IP-based networking protocols. In the illustrated example, the external network 108 includes a weather server 110. The vehicle 100 receives environmental data (e.g., weather data, ambient temperature data, humidity data, precipitation data, etc.) from the weather server 110.

The anti-lock brake system module 106 controls the brakes of the vehicle 100 to control the torque applied to each of the wheels. The anti-lock brake system module 106 includes a stability and traction control system that detects (e.g., via mismatches in the measurements of the wheel speed sensors) when one or more wheels loose traction. In the illustrated example, the anti-lock brake system module 106 includes a friction estimator 112. As disclosed in connection with FIG. 2 below, the friction estimator 112 estimates a coefficient of friction between the tires of the vehicle 100 and the road. The anti-lock brake system module 106 uses the estimated coefficient of friction alter the target slip of the traction control-based systems to the wheels to reduce the frequency that one or more wheel lose traction to cause an adverse driving event (e.g., getting stuck, fishtailing, etc.) considering the surface on which the vehicle 100 is driving.

Figure 2:
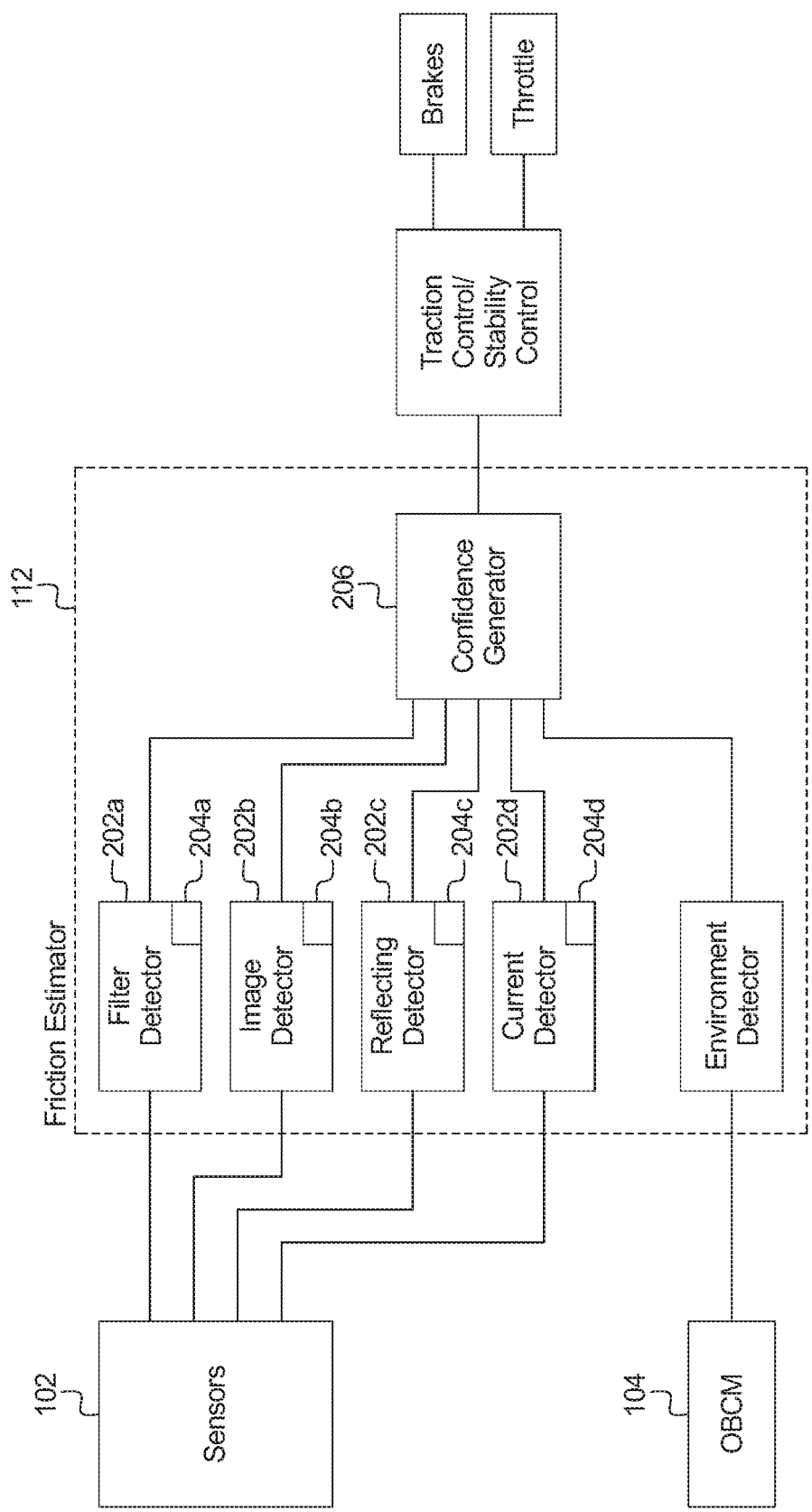
FIG. 2 is a block diagram of a friction estimator of the traction control system of the vehicle of FIG. 1.

FIG. 2 is a block diagram of the friction estimator 112 of the traction control system of the vehicle 100 of FIG. 1. In the illustrated example, the friction estimator 112 receives vehicle operations data and/or images from various sensors 102 and environmental data from the weather server 110 (e.g., via the on-board communications module 104). The friction estimator 112 includes one or more coefficient generators 202*a*-202*d*. The coefficient generators 202*a*-202*d* generate confidence values associated with different road types based on the vehicle operations data from the sensors 102. For example, one of the coefficient generators 202*a*-202*d* may generate confidence values that the surface is 90% likely to be dry asphalt, 7% likely to be wet asphalt, and 3% likely to be gravel. The coefficient generators 202*a*-202*d* include reference tables 204*a*-204*e* that correlate the vehicle operations data with known samples to produce the confidence levels. For example, one coefficient generator 202*a*-202*d* may include reference images in its reference table 204*a*-204*d* to compare images captured by an RGB camera to the reference images to determine the confidence values of the types of road surfaces. A confidence generator 206 compiles the confidence values from the coefficient generators 202*a*-202*d* and estimates a coefficient of friction based on the confidence levels. In some examples, the confidence generator 206 selects the type of road surface that has the highest aggregate confidence value. In some examples, the confidence generator 206 includes a lookup table that associated types of road surfaces with coefficients of friction.

The filter coefficient generator 202*a* receives a signal from the vehicle operations data and individually applies a plurality of filters to the signal. In some examples, the signal is from a suspension vibration sensors and/or a tire pressure monitoring system (TPMS). In some examples, the filter coefficient generator 202*a* applies pre-filters to the signal to filter out normal vehicle behaviors (e.g., turning, engine vibration, wheel speed, etc.) and environmental factors (e.g., variation based on wind, rains, etc.). Each filter is designed to attenuate the signal that exhibits characteristics of a particular type of road condition. For example, the one filter may be designed to attenuate signals generated by the vehicle 100 traversing gravel and another filter may be designed to attenuate signals generated by the vehicle 100 traversing asphalt. The filter coefficient generator 202*a* selects confidence values for different road types based on the amount that the signal is attenuated.

The image coefficient generator 202*b* compares images captured by the cameras of the vehicle 100 to reference images to determine the confidence values for the different types of road surfaces. In some examples, the camera (a) capture images of the road ahead of the vehicle 100 (e.g., two feet ahead, four feet ahead, etc.) based on the current trajectory of the vehicle 100. The confidence values are based on the percentage that an image from the cameras matches one of the reference images. For example, the reference table 204*b* may include one or more images of each of grassy surfaces, dry asphalt surfaces, wet asphalt surfaces, snowy surfaces, icy surfaces, muddy surfaces, and/or gravel surfaces, etc. In some examples, the image coefficient generator 202*b* bases the confidence values based on sizes of features identified in the images. For example, the image coefficient generator 202*b* may determine that images with small features are more likely to contain gravel, sand, or dirt while images with larger features are more likely to be tiles or rocks, etc. In some examples, the image coefficient generator 202*b* also uses color analysis to determine likelihoods that the surface of the road is a particular type of road surface. For example, when the image indicates that the road surface has few or no distinguishable features (e.g., the road surface is asphalt, concrete, snow, or mud, etc.), the image coefficient generator 202*b* may use the color of the surface to determine confidence values.

In some examples, the image coefficient generator 202*b* maps (e.g., via LiDAR, etc.) the reflective surfaces in an image or a series of images. Shimmering or moving bright spots are indicative of the surface of the road being wet. A non-moving speckled surface is indicative of a rough surface. A consistently bright surface is indicative of a homogeneous surface, such as ice, snow, or mud. In some examples, the reference table 204*b* associates luminosity measurements to likely types of road surfaces.

The reflection coefficient generator 202*c* analyze wave patterns broadcast by the range detection sensors to determine the degree that the surface is rough or smooth. As the wave signals are broadcast from the range detection sensors, the wave reflect and refract off the surface in question and some waves return to the sensor. The reflecting/refracting signals are analyzed to determine confidence levels for the various types of surfaces. For example, a smooth surface may have relatively high confidence levels for asphalt, ice, and snow, while rough surfaces may have relatively high confidence level of gravel, etc.

The current coefficient generator 202*d* analyzes changes in steering current draw (e.g., from a current sensor in an electronic power steering (EPS) system, etc.) when the vehicle is traveling at an approximately constance speed. For example, when the current coefficient generator 202*d* detects the steering control unit drawing more current to turn the wheel, the current coefficient generator 202*d* determines that the surface on which the vehicle 100 is driving is rough. The reference table 204*d* associates current draw with confidence levels for the various types of road surfaces.

An environment detector 208 receives environmental data via the on-board communications module 104. The environment detector 208 generates weights to apply to the confidence values generated by the coefficient generators 202*a*-202*d* based on road conditions proximate the vehicle 100 based on the weather data. For example, for a threshold period of time after it has rained, the environment detector 208 may generate weighting factors for types of road surfaces associated with "wetness" (e.g., mud, wet asphalt, etc.) that increase the corresponding confidence values and weighting factors for types of road surfaces associated with "dryness" (e.g., dry asphalt, dirt, etc.) that decrease corresponding that decrease the corresponding confidence values. The weighing factors may be influenced by other environmental factors such as elevation, road trajectory, and recent temperature history. For example, rain on a dirt road will result in weighing factors increase confidence values of mud in valleys due to the formation of likely formation of mud; snow fall outside when the ambient temperature is below freezing will result in weighing factors increasing confidence values related to snow due to the likely accumulation of snow on the road. As another example, the environment detector 208 may use snow plow data may further refine the predicted condition of the road.

Figure 3:
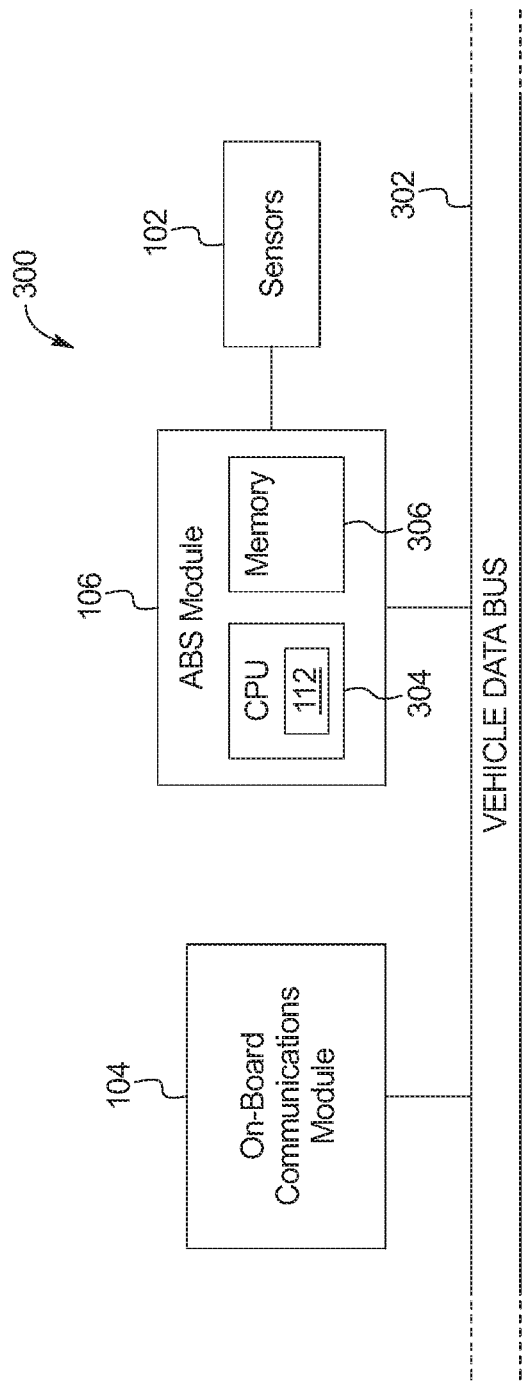
FIG. 3 is a block diagram of the electronic components of the vehicle of FIG. 1.

FIG. 3 is a block diagram of the electronic components 300 of the vehicle 100 of FIG. 1. In the illustrated example, the electronic components 300 include the sensors 102, the on-board communications module 104, the anti-lock brake system module 106, and a vehicle data bus 302.

The anti-lock brake system module 106 includes a processor or controller 304 and memory 306. In the illustrated example, the anti-lock brake system module 106 is structured to include friction estimator 112. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

In the illustrated example, the vehicle data bus 302 communicatively couples the on-board communications module 104 and the anti-lock brake system module 106. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
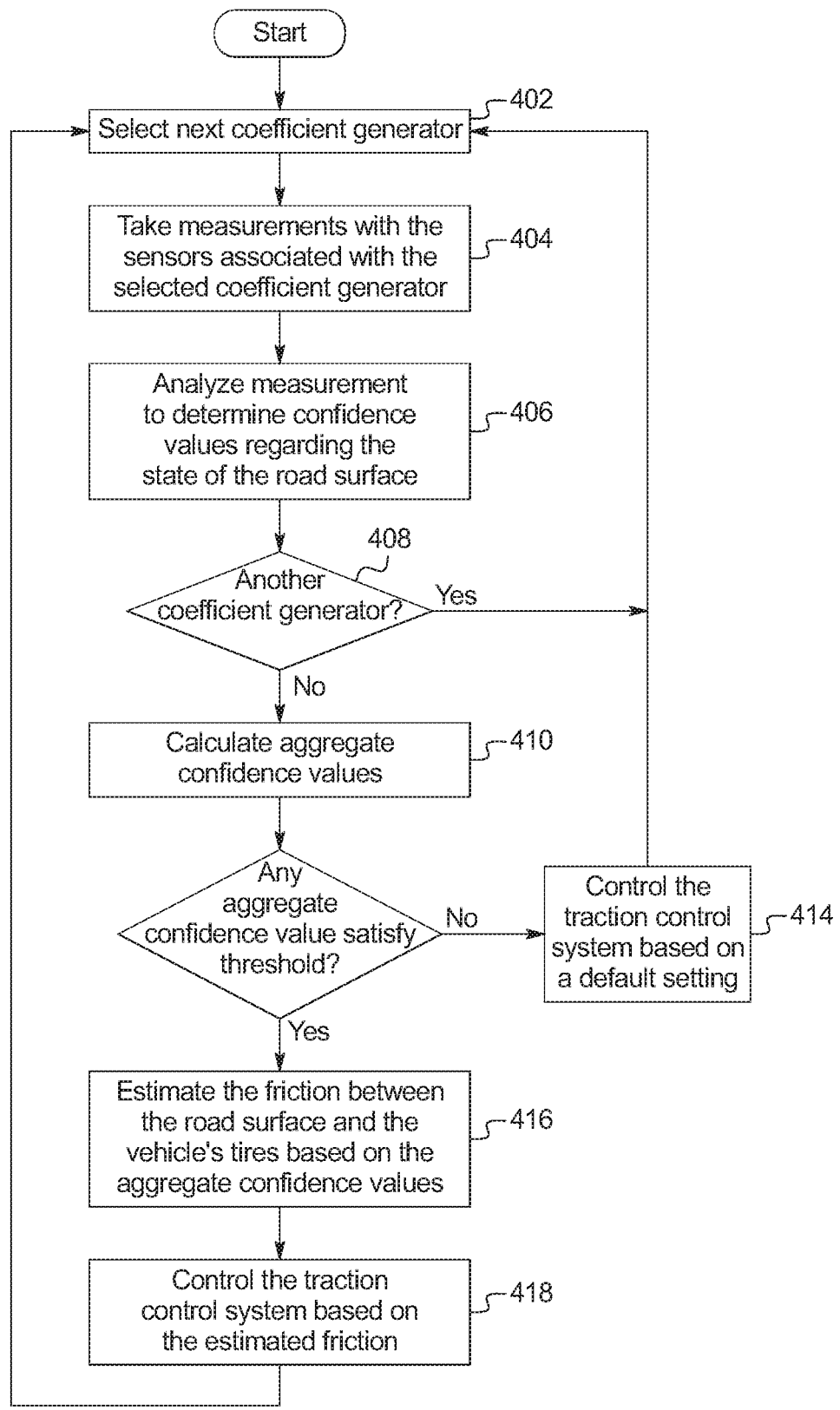
FIG. 4 is a flowchart of a method to control the traction control system bases on an estimated friction, which may be implemented by the electronic components of FIG. 3.

FIG. 4 is a flowchart of a method to control the anti-lock brake system based on an estimated friction, which may be implemented by the electronic components 300 of FIG. 3. Initially, at block 402, the friction estimator 112 selects the next coefficient generator 202a-202d. At block 404, the friction estimator 112 takes measurements with sensors 102 associated with the selected coefficient generator 202a-202d. For example, when the image coefficient generator 202b is selected, the friction estimator 112 captures images from the camera(s). At block 406, the friction estimator 112 analyzes the measurements taken at block 404 to generate confidence values for the types of road surfaces. At block 408, the friction estimator 112 determines whether there is another coefficient generator 202a-202d to select. If there is another coefficient generator 202a-202d to select, the method returns to block 402. Otherwise, when there is not another coefficient generator 202a-202d to select, the method continues to block 410. At block 410, the friction estimator 112 calculates aggregate confidence values for the types of road surfaces. In some examples, the friction estimator 112 applies weighing factors to the confidence values based on environmental or luminosity data. At block 412, the friction estimator 112 determines whether the aggregate confidence value associated with any of the types of road surfaces satisfies (e.g., is greater than or equal to) a confidence threshold. For example, the confidence threshold may be 70%. When the whether the aggregate confidence value associated with any of the types of road surfaces satisfy the confidence threshold, the method continues at block 416. Otherwise, when the whether the aggregate confidence value associated with none of the types of road surfaces satisfy the confidence threshold, the method continues at block 414.

At block 414, the anti-lock brake system module 106 controls the traction control system, rollover control system and/or the stability control system based on a default target slip (e.g., 0% slip, etc.). At block 416, the friction estimator 112 estimates the friction between the road surface and the tires of the vehicle 100 based on the aggregate confidence values for the types of road surfaces. At block 418, the anti-lock brake system module 106 controls the traction control system, rollover control system and/or the stability control system based on the estimated coefficient of friction. For example, the anti-lock brake system module 106 may change the torque applied to one or more wheels, change the relationship between the input of the acceleration pedal and the delivered torque, and/or the wheel slip (e.g., as represented by the slip target, etc.).

The flowchart of FIG. 4 is representative of machine readable instructions stored in memory (such as the memory 306 of FIG. 3) that comprise one or more programs that, when executed by a processor (such as the processor 304 of FIG. 3), cause the vehicle 100 to implement the example friction estimator 112 and/or more generally, the example anti-lock brake system module 106 of FIGS. 1, 2, and 3. Further, although the example program(s) is/are described with reference to the flowchart illustrated in FIG. 4, many other methods of implementing the example friction estimator 112 and/or more generally, the example anti-lock brake system module 106 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a plurality of sensors to measure qualities of a road surface;
   a processor configured to:
      receive a signal from a first sensor of the plurality of sensors;
      apply a first filter to the signal, the first filter configured to filter out signals from a road surface of a first road surface type;
      estimate a first confidence value that a road the vehicle is on is a road surface of the first road surface type based on a change to the signal that results from applying the first filter to the signal;
      estimate a coefficient of friction between the road surface and tires of the vehicle based on a final confidence value, the final confidence value being based on the first confidence value; and
      control wheels of the vehicle by altering a target slip based on the coefficient of friction.

2. The vehicle of claim 1, wherein the first confidence value is representative of a likelihood that the road surface corresponds with a particular road surface type.

3. The vehicle of claim 1, wherein the plurality of sensors includes a camera.

4. The vehicle of claim 3, wherein the processor configured to estimate the first confidence value is further configured to:
   capture an image of a road surface ahead of the vehicle; and
   compare the image to a reference image of the first road surface type.

5. The vehicle of claim 3, wherein the processor configured to estimate the first confidence value is further configured to:
   capture a series of images of a road surface ahead of the vehicle;
   determine luminosity values and changes of the luminosity values within the series of images; and
   compare the luminosity values and changes of the luminosity values to values stored in a table.

6. The vehicle of claim 1, wherein the plurality of sensors includes an ultrasonic sensor.

7. The vehicle of claim 6, wherein the processor configured to estimate the first confidence value is further configured to:
   broadcast a wave signal in front of the vehicle; and
   analyze reflection patterns and refraction patterns of the wave signal off the road surface to determine the first confidence value.

8. The vehicle of claim 1, wherein the plurality of sensors includes at least one of a suspension vibration sensor or an accelerometer.

9. The vehicle of claim 1, wherein the processor is further configured to:
   apply a weighing factor to the first confidence value based on environmental data information received from a remote weather server.

10. The vehicle of claim 1, wherein the processor configured to estimate the first confidence value is further configured to:
    determine a steering current draw of the vehicle.

11. The vehicle of claim 1, wherein the processor is further configured to:
    determine a second confidence value that the road is a road surface of the first road type; and
    aggregate the first confidence value and the second confidence value to determine the final confidence value.

12. The vehicle of claim 1, wherein estimating the coefficient of friction between the road surface and tires of the vehicle based on the final confidence value is further based on a determination that the first confidence value is greater than a third confidence value that the vehicle is on a road of a second road type.

13. The vehicle of claim 1, wherein estimating the coefficient of friction between the road surface and tires of the vehicle based on the final confidence value is further based on a determination that the final confidence value is greater than a threshold.

14. A method comprising:
    receiving a signal from a first sensor of a plurality of sensors of a vehicle;
    applying a first filter to the signal, the first filter configured to filter out signals from a road surface of a first road surface type;
    estimating a first confidence value that a road the vehicle is on is a road surface of the first road surface type based on a change to the signal that results from applying the first filter to the signal;
    estimating a coefficient of friction between the road surface and tires of the vehicle based on a final confidence value, the final confidence value being based on the first confidence value; and
    controlling wheels of the vehicle by altering a target slip based on the coefficient of friction.

* * * * *